(12) United States Patent
Pagliuca et al.

(10) Patent No.: US 9,390,835 B2
(45) Date of Patent: Jul. 12, 2016

(54) HIGH TEMPERATURE INSULATING TAPE AND WIRE OR CABLE SHEATHED THEREWITH

(71) Applicant: Tyco Electronics UK Ltd., Wiltshire (GB)

(72) Inventors: Antonio Pagliuca, Oxfordshire (GB); Philip Hammond, Wiltshire (GB)

(73) Assignee: Tyco Electronics UK Ltd., Wiltshire (GB)

( * ) Notice: Subject to any disclaimer, the term of this patent is extended or adjusted under 35 U.S.C. 154(b) by 141 days.

(21) Appl. No.: 14/134,386

(22) Filed: Dec. 19, 2013

(65) Prior Publication Data

US 2014/0102758 A1    Apr. 17, 2014

Related U.S. Application Data

(63) Continuation of application No. PCT/GB2012/051315, filed on Jun. 11, 2012.

(30) Foreign Application Priority Data

Jun. 20, 2011 (GB) .................................. 1110395.9

(51) Int. Cl.
*H01B 7/00* (2006.01)
*H01B 7/02* (2006.01)
*B32B 27/08* (2006.01)
*B32B 27/20* (2006.01)
(Continued)

(52) U.S. Cl.
CPC ................ *H01B 7/0225* (2013.01); *B32B 7/12* (2013.01); *B32B 27/08* (2013.01); *B32B 27/20* (2013.01); *B32B 27/283* (2013.01); *B32B 27/285* (2013.01); *B32B 27/288* (2013.01); *H01B 3/427* (2013.01); *H01B 3/445* (2013.01); *H01B 13/08* (2013.01); *H01B 13/26* (2013.01); *B32B 2250/02* (2013.01); *B32B 2250/24* (2013.01); *B32B 2255/10* (2013.01); *B32B 2255/26* (2013.01); *B32B 2264/102* (2013.01); *B32B 2307/206* (2013.01); *B32B 2307/3065* (2013.01);
(Continued)

(58) Field of Classification Search
CPC ............. H01B 3/00; H01B 7/00; H01B 11/00
USPC ............. 174/110 R–110 PM, 120 R, 120 SR, 174/121 R, 121 SR
See application file for complete search history.

(56) References Cited

U.S. PATENT DOCUMENTS

2008/0014423 A1 *  1/2008  Garrison et al. .............. 428/220

FOREIGN PATENT DOCUMENTS

EP        0572177 A1    1/1993
GB        2460686 A    12/2009
(Continued)

OTHER PUBLICATIONS

PCT International Preliminary Report on Patentability and Written Opinion of the International Searching Authority for International application No. PCT/GB2012/051315, dated Dec. 23, 2013, 6 pages.
(Continued)

*Primary Examiner* — William H Mayo, III
(74) *Attorney, Agent, or Firm* — Barley Snyder

(57) ABSTRACT

A composite coating includes a first layer, a second layer, and a fluoropolymer film disposed on the second layer. The first layer includes a polymer matrix with mica particles dispersed throughout, while the second layer includes a polyether ether ketone (PEEK).

24 Claims, 2 Drawing Sheets

(51) Int. Cl.
*B32B 7/12* (2006.01)
*B32B 27/28* (2006.01)
*H01B 13/08* (2006.01)
*H01B 13/26* (2006.01)
*H01B 3/42* (2006.01)
*H01B 3/44* (2006.01)

(52) U.S. Cl.
CPC ..... *B32B 2307/554* (2013.01); *B32B 2307/714* (2013.01); *B32B 2457/04* (2013.01); *Y10T 428/3154* (2015.04)

(56) References Cited

FOREIGN PATENT DOCUMENTS

| GB | 2492087 A | * | 12/2009 | ............... H01B 7/29 |
| GB | 2471322 A | * | 12/2010 | ............... H01B 7/29 |
| GB | 2471322 A | | 12/2010 | |
| JP | 2000011772 A | | 1/2000 | |
| JP | 2003100149 A | | 4/2003 | |
| JP | 2006120456 A | | 5/2006 | |
| WO | 8900757 A1 | | 1/1989 | |
| WO | 2011144933 A1 | | 11/2011 | |

OTHER PUBLICATIONS

PCT Notification Concerning Transmittal of International Preliminary Report on Patentability for International application No. PCT/GB2012/051315, dated Jan. 9, 2014, 1 page.

PCT Notification and the International Search Report and Written Opinion of the International Searching Authority, dated Sep. 12, 2012, 10 pages.

* cited by examiner

HIGH TEMPERATURE INSULATING TAPE AND WIRE OR CABLE SHEATHED THEREWITH

CROSS-REFERENCE TO RELATED APPLICATIONS

This application is a continuation of PCT International Application No. PCT/GB2012/051315 filed on Jun. 11, 2012, which claims priority under 35 U.S.C. § 119 to Great Britain Patent Application No. 1110395.9 filed Jun. 20, 2011.

FIELD OF INVENTION

The invention relates to a wire or cable and, in particular, a high temperature resistant wires or cable for use in extreme conditions such as in drilling or mining, commercial or military aerospace and marine applications and automotive, rail and mass transport.

BACKGROUND

Known high performance wires generally include a functional core such as an electrical conductor or optical fiber, and one or more insulating and/or protective coatings. These coatings should be flexible and not too bulky, since wires are required in many cases to be of small diameter. Such small diameter, high performance wires may be formed by wrapping thin single or multilayer tapes, by extrusion or by a combination of these techniques.

Various types of polymers are known for use with wire and cable sheathing, such as polytetrafluoroethylene (PTFE) and polyetheretherketone (PEEK). PTFE has the advantage of being very tough as well as chemically inert, with a high softening point, low coefficient of friction and good electrical insulating properties.

PEEK has found increasing use in wire and cable sheathing since it has good flame resistance, being self-extinguishing with very low smoke. It also has good elongation, good flexibility in thin sections, such as films and good mechanical resistance to dynamic cut-through and scrape abrasion. It can however be susceptible to arc tracking, as well as reaction with acetone and strong acids.

EP-A-572 177 discloses a known electrical insulation laminate of porous PTFE and PEEK. The purpose being to provide a flexible electrical insulation material for air frame wire insulation which is lightweight with high mechanical strength, thermal resistance and chemical resistance and reduced dielectric constant.

There is a demand for wire and cable insulations that are resistant to fire as well as to very high temperatures. One way of imparting such flame resistance is to apply a coating comprising mica particles, typically platelets, dispersed in a polymer matrix. JP-A-2003100149 for example discloses the use of a dispersion of fine mica powder and glass frit in a silicone resin for coating fire resistant cables.

Mica can however add to the cost and accordingly there is a need to reduce the mica content of cable sheaths. For example, JP-A-2006120456 seeks to avoid the use of mica by combining a glass tape to impart tensile strength and dimensional stability with a silicone tape to impart heat resistance, electrical characteristics and adhesiveness.

JP-A-2000011772 discloses a fire resistant coating made with a cross-linked silicone rubber mixed with aluminium hydroxide and mica powder.

There is also a requirement for wires and cables of reduced diameter, which could be achieved by using sheaths of reduced thickness.

GB-A-2460686 discloses a wire having a functional core and a sheath including an inner flame proofing layer comprising mica particles dispensed in a polymer matrix such as silicone, a wrapped film of PEEK and an outer coating of PEEK or another polymer. In this way the required temperature and flame resistance can be obtained with mica confined to one layer of three, with a thickness of preferably not more than 100 μm.

WO8900757 describes a wire having good electrical and mechanical properties with an inorganic arc-control layer surrounding the conductor, an insulating layer comprising an aromatic polymer which surrounds the arc control layer and a secondary tracking control layer surrounding the insulating layer. The wire exhibits good resistance to dry arcing and wet tracking There remains, however, a need for wires and cables which, in addition to good insulation and high temperature resistance, have improved mechanical properties, especially at high temperatures.

SUMMARY

A composite coating includes a first layer, a second layer, and a fluoropolymer film disposed on the second layer. The first layer includes a polymer matrix with mica particles dispersed throughout, while the second layer includes a polyether ether ketone (PEEK).

BRIEF DESCRIPTION OF THE DRAWINGS

An exemplary embodiment of the invention will now be described with reference to the accompanying drawings wherein.

DETAILED DESCRIPTION OF THE EMBODIMENT(S)

Figure 1:
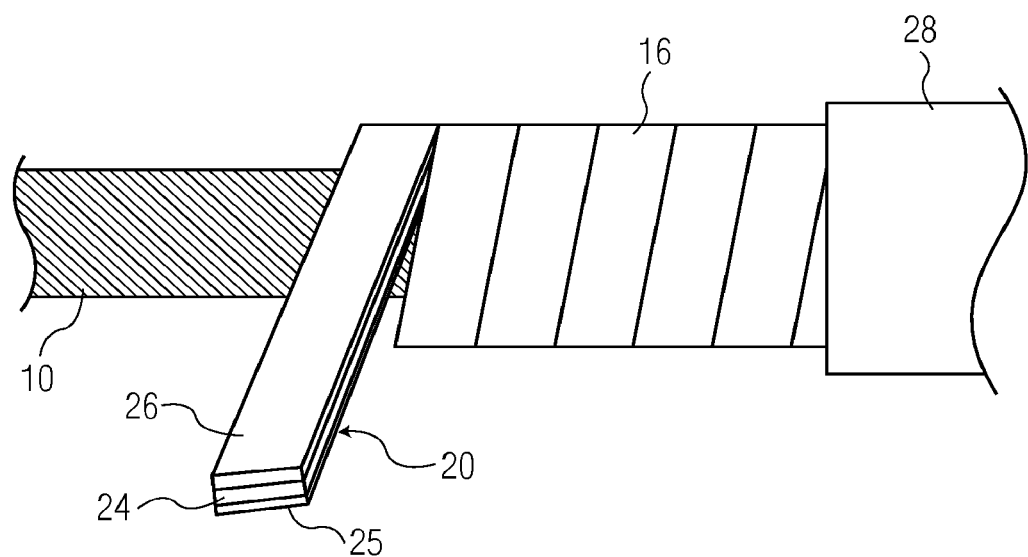
FIG. 1 is a perspective view of an insulated wire according to the invention.

Referring first to FIG. 1, a multi-stranded conductor 10, which may for example be copper, uncoated or coated with nickel, silver or tin, aluminium, which may be copper clad, steel or a non-metallic cable such as carbon fiber, polymer fiber or ceramic fiber, has a three-layer sheath applied to it by winding and/or extrusion. A composite coating 20 is provided along the core to form a wound coating 16. In the shown embodiment, the composite coating 20 is spirally wound on the core.

The composite coating 20 includes a first layer 24, for example of silicone with mica platelets distributed throughout. A coating 25 of a fluoropolymer, such as PTFE, is disposed along a surface nearest the core 10.

A second layer 26, of PEEK or a blend or alloy of PEEK, is laminated on the opposite side of the first layer 24.

Finally an outer layer 28 of fluoropolymer may also be applied, for example by extrusion or wrapping. In FIG. 1, this layer is shown as being extruded, but it could be wrapped as a composite film with the first and second layers 24, 26.

An adhesive tie layer (not shown) may be applied prior to application of the extruded outer layer 28, particularly in cases where the composite coating includes a fluoropolymer outer coating on the second layer of the tape wrapping. Suitable materials for the tie layer include an epoxy or maleic functionalised fluorinated elastomer or, more preferably, a functionalised fluoropolymer such as PFA or PTFE. The adhesive tie layer may be applied by extrusion or by other coating methods such as dip coating. Additionally, or alternatively, a heating or sintering step may be carried out prior to application of the outer layer 28 in order to fuse the first and second layer 24, 26 of the wrapped composite coating 20.

Advantages of the fluoropolymer coatings, which form inner and/or outer layers when the tape is applied to a wire, include increased electrical insulation and improved stripping of insulation for wire termination.

The first and second layers 24, 26 are preferably wound spirally around the core with an overlap of 40 to 70%, preferably 48 to 58%.

Figure 2:
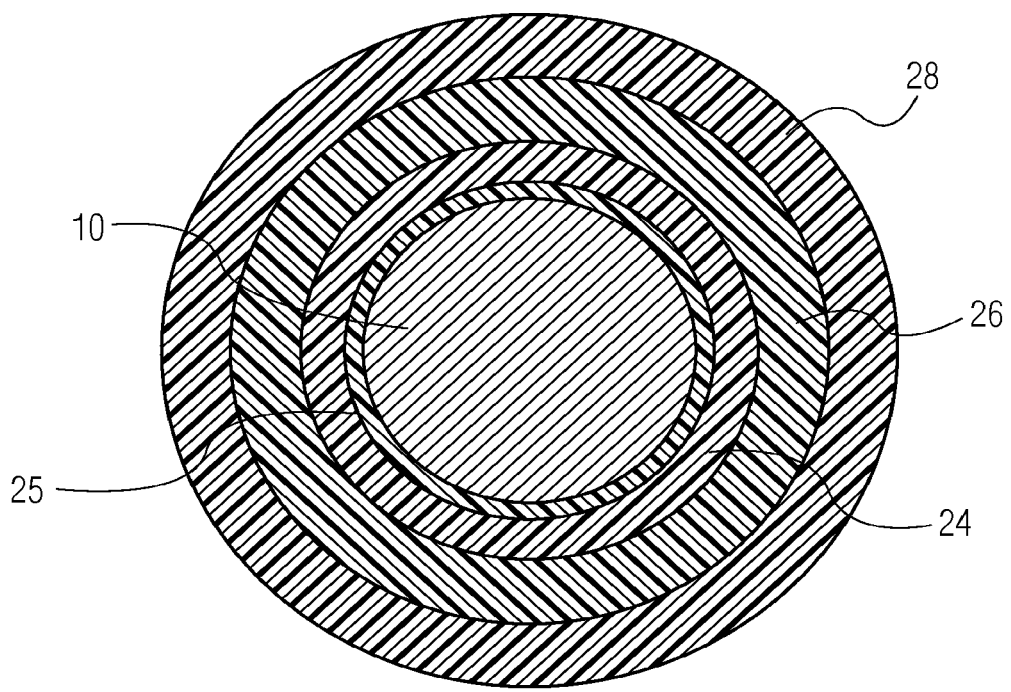
FIG. 2 is a cross-section of the insulated wire according to the invention.

Further advantages of a coating applied to the mica-containing first layer 24, which forms an inner layer, include excellent electrical properties, notably increased insulation and resistance to dry/wet arc tracking With respect to FIG. 2, a three-layer sheath has been applied around the conductor 10, for example as described in relation to FIG. 1. The first layer 24, surrounding the conductor, is a mica-containing sheath to impart insulation and possibly flame resistance. This may for example be of mica-containing silicone. This layer has on its inner surface, next to the conductor, a coating 25 of fluoropolymer.

The second layer 26 includes PEEK having a thickness of 25 to 100 μm. The PEEK may be used alone or as a blend or alloy with other polymers. The blend or alloy should contain at least 50%, and more preferably at least 65%, of PEEK. While the PEEK second layer may have a thickness of 25 to 100 μm, the second layer 26 may have a thickness of 25 to 75 μm.

The PEEK may be blended or alloyed with other polyaryl ether ketones (PAEK). these comprise chains of aromatic rings with some linked by oxygen atoms and others by carbonyl groups. Many of these have higher melting points and glass transition temperatures than PEEK.

Examples of PAEKs that may form part of a PEEK alloy layer are set out in Table 1 below, in which the polymers are indentified by their abbreviated names where E stands for ether and K for ketone and Φ indicates a benzene ring, so that for example PEKK is polyetherketoneketone. Melting points ($T_m$) and glass transition temperatures ($T_g$) are also given. The preferred polymers for alloying or blending are those in which the ratio of ketone linkages to ether linkages is 1:1 or greater, these compounds having the higher $T_g$ and $T_m$.

TABLE 1

| Polymer | Structure | $T_g$ (° C.) | $T_m$ (° C.) |
| --- | --- | --- | --- |
| PEK | -(-0-Φ-C0-Φ-)-$_n$ | 163 | 361 |
| PEEKK | -(-0-Φ-0-Φ-C0-Φ-C0-Φ)$_n$ | 154 | 358 |
| PEKEKK | -(-0-Φ-C0-Φ-0-Φ-C0-Φ-C0-Φ)-$_n$ | 173 | 371 |
| PEKK | -(-0-Φ-C0-Φ-C0-Φ-)-$_n$ | 165 | 391 |
| PEKKK | -(-0-Φ-C0-Φ-C0-Φ-C0-Φ-)-$_n$ | 175 | 439 |

Other polymers that may be blended or alloyed with the PEEK include those made up of heterocyclic units containing a six-membered ring fused to a five-membered ring, for example polyimide, polybenzimidazole, polybenzoxazole and polybenzothiazole and copolymers thereof The outer layer 28 can be either extruded or wrapped, suitably as part of a composite coating with the first and second layers. It provides an encapsulation layer to form an additional layer of protection to the cable. Any of the polymers, polymer blends or alloys listed above for this layer can be used. PTFE for example could sintered to provide exceptional chemical resistance as required by the aerospace market.

The fluoropolymer outer layer 28 is provided for additional strength, chemical resistance, flexibility and/or flame resistance. It can also improve abrasion resistance, primarily by eliminating the surface undulations that are typical of wrapped wires. This outer layer 28 may for example include PTFE, polyvinylidene fluoride (PVDF), polyethylenetetrafluroethylene, (ETFE), polyfluoroalkoxy (PFA) or copolymers or blends or alloys of any of these. The outer layer 28 may be fixed or may be fused or sintered, preferably at a temperature of 350° to 420° C.

The synergistic combination of mica-containing polymer and PEEK in this embodiment can provide a high temperature, fire resistant wire with potentially low weight and low overall diameter. The mica can provide insulation and fire resistance up 1000° C., and in combination with the PEEK provides improved mechanical properties including dynamic cut-through resistance, even at high temperatures, non burning characteristics and very low smoke emission.

The manufacturing process, which could include high temperature sintering, must support semi-crystallinity in the structural PEEK layer The two layers 24 and 26 are applied as in FIG. 1, as a preformed single composite wrapped layer from a tape as shown in FIG. 1. The mica layer includes mica particles dispensed in a polymeric matrix such as silicone or a polymeric siloxane, with the inner coating layer, the first layer 24. For the outer fluoropolymer layer 28, the range of contents may be the same as in the embodiment described above. Again, the outer layer may be sintered.

Figure 3:
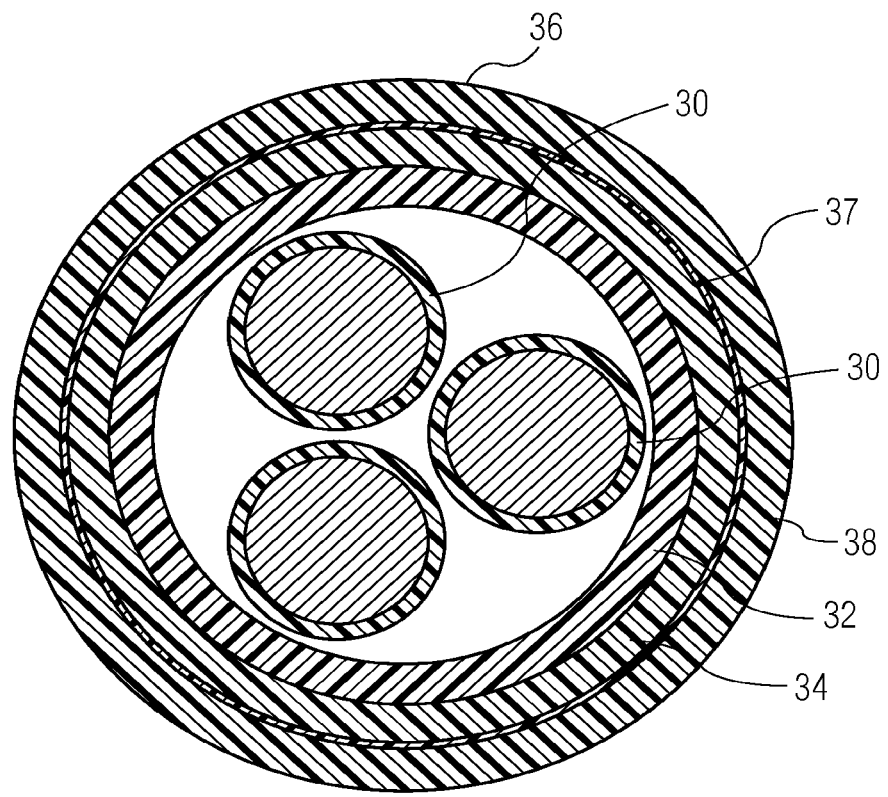
FIG. 3 is a cross-section of another insulated wire according to the invention.

As shown in FIG. 3, a wrapped composite film 36 can be used as a structural layer for a wide variety of wire or cable constructions. This could include a conductor with another polymeric insulation, a complete cable construction with or without a braid, such as a twisted pair or a quad of twisted pairs such as Cat 7 cable. In the shown embodiment in FIG. 3, the coating of the invention is formed around a three-core cable 30 with a tape wrapping in accordance with the invention, which includes an inner flame proofing or fire-resistant insulation layer 32 of mica particles in a matrix of silica or the like, an intermediate layer 34 of PEEK polymer or polymer blend and a fluoropolymer outer film 37 on the PEEK layer. The sheath is completed by an outer protective layer 38. This can be applied by extrusion or wrapping and can have a composition selected from the same ranges as the protective layers of the embodiments described above.

To render the protective sheath still tougher and more resistant to chemical attack, the sheath around the wire or cable of the invention may be cross linked using electron beam radiation, preferably at elevated temperature and preferably in an inert atmosphere.

Finally, the sheath may be subjected to an annealing process, suitably at 170 to 300° C., preferably for at least 12 hours and up to 24 hours.

Figure 4:
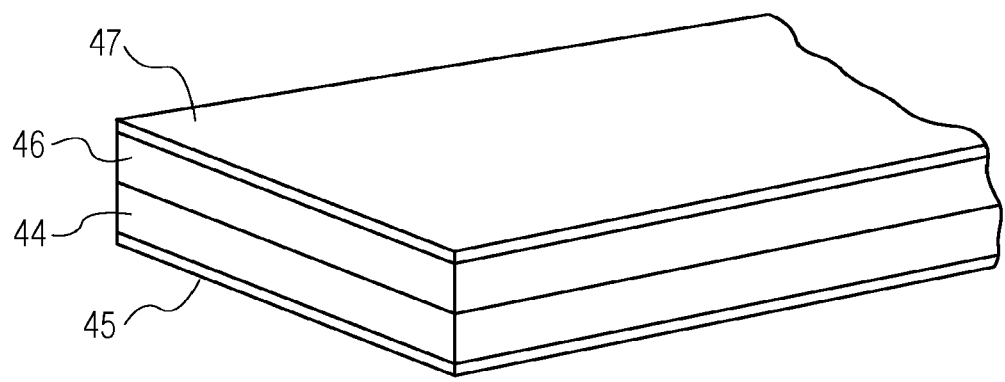
FIG. 4 is an enlarged view of a composite coating of the insulated wire according to the invention.

Referring now to FIG. 4, another composite coating in accordance with the invention is described, in which the first and second layers are numbered as 44 and 46 respectively. These may have the same compositions as the corresponding layers in the embodiments of FIGS. 1 to 3.

In the shown embodiment, a fluorocarbon coating 45 is applied to the side of the first layer opposite the second, which will be the inside of the coating to be formed by wrapping the tape around a conductor. A second fluorocarbon coating 47 is applied to the second coating 46, on the side opposite the first coating 44 that constitutes an outer layer of the wrapped film, over which a further protective outer layer of a fluoropolymer may be applied, by wrapping or extrusion.

The composite coating for the invention may be modular in design. The mica layer can be increased in thickness to impart proportionately increased fire resistant properties in addition to electrical insulation. While the preferred thickness for this layer will not exceed 50 µm for most purposes, in order to keep the overall wire diameter to a minimum, where fire resistance is required the thickness of this layer may be greater than 50 µm, for example in a range from 50 to 100 µm. The thicknesses or other layers may also be adjusted to meet individual requirements.

In the case of a fluoropolymer coating on the outside of a wire insulated with a wrapped tape that has such a coating on the PEEK layer, the fluoropolymer layer can be heated to fuse it and create a homogeneous layer.

The invention described above can be applied to numerous different types of cores, notably conductive wires or cables, for example copper, which may be nickel- or tin-coated or silver-plated, aluminium, typically copper-clad aluminium, silver or steel. For other purposes, non-metallic cores such as carbon fiber or polymeric or ceramic cores may be used. The cable may be single core or multi-core or may comprise a twisted pair of wires, a multi-strand core or a braid. Any of these cores may be coated with copper, nickel, tin or silver.

Although several embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A composite coating comprising:
    a first layer having a polymer matrix with mica particles dispersed throughout;
    a second layer having a polyether ether ketone (PEEK);
    a fluoropolymer film disposed on the second layer; and
    a third layer applied to a surface of the first layer opposite the second layer.

2. The composite coating according to claim 1, wherein the first layer and the second layer are laminated.

3. The composite coating according to claim 2, wherein the second layer further includes polyaryl ether ketone (PAEK).

4. The composite coating according to claim 3, wherein the second layer further includes a polymer of heterocyclic units containing a six-membered ring fused with a five-membered ring.

5. The composite coating according to claim 1, wherein the first layer and the second layer are co-extruded.

6. The composite coating according to claim 1, wherein the second layer includes a blend containing at least 50% by weight of PEEK.

7. The composite coating according to claim 6, wherein the second layer includes at least 65% by weight of PEEK.

8. The composite coating according to claim 1, wherein the second layer includes a alloy containing at least 50% by weight of PEEK.

9. The composite coating according to claim 4, wherein the second layer includes at least 65% by weight of PEEK.

10. The composite coating according to claim 1, wherein the third layer is a fluorocarbon layer.

11. A wire or cable comprising:
    a core; and
    a sheath disposed over the core, wherein the sheath includes:
        a first layer having mica particles dispersed there through;
        a second layer having a polyether ether ketone (PEEK);
        an outer layer having fluoropolymer disposed on the second layer; and
        an inner layer applied to a surface of the first layer opposite the second layer.

12. The wire or cable according to claim 11 wherein the outer layer is sintered or fused.

13. The wire or cable according to claim 11, wherein the second layer is partly sintered or fused.

14. The wire or cable according to claim 13, wherein the sheath is sintered.

15. The wire or cable according to claim 14, wherein the sheath is spirally wound onto the core with an overlap of 40% to 70%.

16. The wire or cable according to claim 14, wherein the sheath is spirally wound onto the core with an overlap of 48% to 58%.

17. The wire or cable according to claim 11, wherein the sheath is wrapped around the core.

18. The wire or cable according to claim 11 wherein each of the first and second layers and the outer layer has a thickness of 25µm to 100µm.

19. The wire or cable according to claim 11, wherein each of the first and second layers and the outer layer has a thickness of 25µm to 50µm.

20. A method of making an insulated wire or cable, comprising the steps of:
    forming a sheath having a composite coating with an outer layer of a fluoropolymer;
    spirally wrapping the sheath onto an elongated core; and
    annealing the sheath at 170° C. to 300° C.

21. The method according to claim 20, wherein the outer layer is sintered to another layer of the composite coating.

22. The method according to claim 20, wherein the outer layer is sintered at a temperature range from 350° C. to 420° C.

23. The method according to claim 20, wherein the outer layer is cross-linked by an application of electron beam radiation in an inert atmosphere.

24. The method according to claim 20, wherein the annealing step is conducted for between 12 and 24 hours.

* * * * *